United States Patent [19]

Stearley

[11] 4,078,717
[45] Mar. 14, 1978

[54] BAG WITH OPENING MEANS

[75] Inventor: Robert J. Stearley, Des Moines, Iowa

[73] Assignee: Great Plains Bag Corporation, Des Moines, Iowa

[21] Appl. No.: 780,423

[22] Filed: Mar. 23, 1977

[51] Int. Cl.² .......................................... B65D 33/00
[52] U.S. Cl. .................................................. 229/53
[58] Field of Search ........................ 150/1; 229/53, 66

[56] References Cited

U.S. PATENT DOCUMENTS

| | | | |
|---|---|---|---|
| 2,189,174 | 2/1940 | Hohl | 229/53 |
| 2,286,465 | 6/1942 | Clement | 229/66 |
| 2,538,920 | 1/1951 | Shumann | 229/53 |
| 3,036,756 | 5/1962 | Lieschke | 229/66 |
| 3,113,715 | 12/1963 | Pangrac | 229/53 |
| 3,216,646 | 11/1965 | Cook | 229/66 X |
| 3,283,992 | 11/1966 | Hanson | 229/53 |
| 3,411,698 | 11/1968 | Reynolds | 229/53 |
| 3,979,050 | 9/1976 | Cilia | 229/66 |

Primary Examiner—Donald F. Norton
Attorney, Agent, or Firm—Zarley, McKee, Thomte, Voorhees & Sease

[57] ABSTRACT

The bag of the present invention is formed by extruding an elongated tube of sheet material and forming the tube into a gusseted tube having in-tucked gusseted walls at the lateral edges thereof. After the formation of the gussets, the tube is expanded by means of an air bubble, and the gussets are forced outwardly so that the tube is formed into a nongusseted tube. The creases which formed the original gusset walls remain in the tube and in cross-section form apexes forming outwardly from the front and rear walls of the tube. These apexes provide means for grasping and opening the upper end of the tube when the bag is being filled.

6 Claims, 8 Drawing Figures

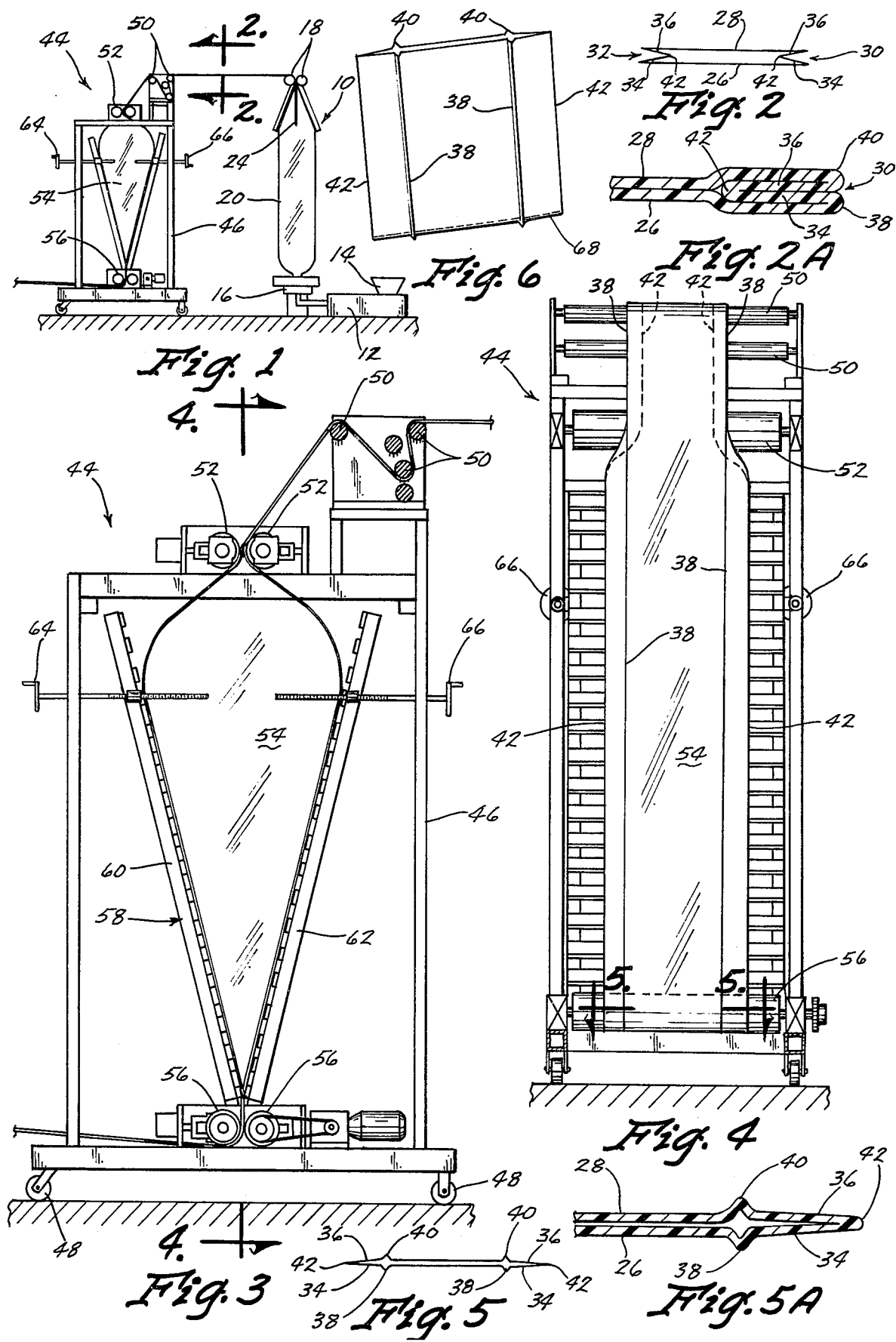

BAG WITH OPENING MEANS

BACKGROUND OF THE INVENTION

This invention relates to tube bags which do not have gussets in their lateral edges.

Specifically the invention relates to an improvement in producing flat continuous tube style, bottom sealed, plastic bags which have flush cut top openings. Presently, flush cut top opening bags manufactured from a homogeneous plastic resin are well known. The problem encountered with these types of bags is that the inner surface of the bag tends to have a cohesive effect which makes the opening at the upper end of the bag very difficult. Consequently, the bag filling operation is slow and cumbersome due to the difficulty which the operator has in opening the upper end of the bag.

Various efforts have been made to ease the manner in which the upper end of the bag may be opened. One presently known method comprises the use of a chilled mandrel on the interior surface of the bag which causes stresses in the plastic film to produce a flaring of the top of the bag. However, such flaring is sometimes undesirable inasmuch as it makes the bag have an irregular shape.

Another method presently used in the manufacture of what is called a "tube turned" bag. The plastic film is extruded into a flat tube construction and then is printed. After printing, the tube is partially opened up and rotated three to five inches. The tube is then collapsed leaving the original creases spaced inwardly from the lateral margins of the bag. Such a process is cumbersome inasmuch as it requires rotation of the tube during the high speed manufacturing process.

SUMMARY OF THE INVENTION

The present invention comprises the formation of a gusseted bag tube having in-tucked V-shaped gusset walls at the lateral margins of the tube. Then a sufficient quantity of air is introduced into the gusseted tubing to cause it to assume a cylindrical shape. The tube is then collapsed into a non-gusseted tube with the V-shaped apexes of the original gusset walls pointing outwardly rather than inwardly as originally formed. The resulting structure is the formation of longitudinal creases spaced inwardly from the lateral margins of the tube. These longitudinal creases have in cross section V-shaped apexes which extend frontwardly and rearwardly from the front and rear walls, and provide a means for easily grasping the upper end of the tube and opening it for filling.

Therefore, a primary object of the present invention is the provision of a bag having a flush cut open upper end which can be easily grasped for opening.

A further object of the present invention is the provision of a bag which is readily adapted to continuous mass production.

A further object of the present invention is the provision of a bag on which printing may be easily applied.

A further object of the present invention is the provision of a bag which is economical to manufacture and durable in use.

DESCRIPTION OF THE FIGURES OF DRAWINGS

FIG. 1 is a frontal view of the machinery for making the bag.

FIG. 2 is a sectional view taken along line 2—2 of FIG. 1.

FIG. 2a is an enlarged view of the W-shaped folds at the lateral margins of the bag shown in FIG. 2.

FIG. 3 is an enlarged plan view of a portion of the machinery shown in FIG. 1.

FIG. 4 is a sectional view taken along line 4—4 of FIG. 3.

FIG. 5 is a sectional view taken along line 5—5 of FIG. 4.

FIG. 5a is an enlarged sectional view of one lateral margin of the tube shown in FIG. 5.

FIG. 6 is a perspective view of a completed bag of the present invention.

DETAILED DESCRIPTION OF THE DRAWINGS

Referring to the drawings, FIG. 1 shows the apparatus for forming the bag tube of the present invention. The numeral 10 designates the apparatus for the first stage of the operation. Apparatus 10 comprises a conventional plastic tube extruder 12 having a hopper 14 for receiving resin pellets to form the plastic of which the bag is made. The plastic is extruded through a die 16 to form a continuous seamless tube of plastic material. Air is introduced to the tube during the initiation of the extrusion process, and then the tube is threaded through a pair of nip rollers 18, so as to trap an air bubble 20 inside the tube. A V-shaped collapsing frame 22 collapses the tube immediately prior to the time that it passes through nip rollers 18.

A pair of conventional gusseting rods 24 are provided immediately adjacent nip rollers 18 for forming V-shaped in-tucked gusseted walls in the tube. All the foregoing structure is conventional in the manufacture of plastic bags and therefore will be described in no further detail.

Referring to FIGS. 2 and 2a, the gusseted tube exiting from nip rollers 18 includes a front wall 26, a rear wall 28, and two V-shaped gusset walls 30, 32 interconnecting the front and rear walls 26 and 28. Gusset walls 30, 32 each comprise a front gusset portion 34 and a rear gusset portion 36.

Nip rollers 18 cause creases to be formed at the lateral margins of the bag tube shown in FIG. 2a. A front crease 38 is formed at the juncture between front wall 26 and front gusset portion 34; a rear crease 40 is formed at the juncture between rear wall 28 and rear gusset portion 36, and a gusset crease 42 is formed at the V-shaped apex of front and rear gusset portions 34, 36. These creases are permanent in nature and are retained regardless of the configuration of the bag.

After the gusseted tube exits from nip rollers 18, it passes to a secondary apparatus designated by the numeral 44. Apparatus 44 comprises a frame 46 which is supported by casters 48 which permit it to be moved to the appropriate position in connection with apparatus 10. Mounted at the upper end of apparatus 44 are a plurality of guide rollers 50 which receive the flattened gusseted tube exiting from nip rollers 18.

The gusseted flattened tube then passes through a second pair of nip rollers 52. At this point, a second air bubble 54 is introduced to the gusseted tube and the tube is then passed through a third pair of nip rollers 56, thereby causing air bubble 54 to be trapped within the moving gusseted tube. An adjustable collapsing frame 58 is V-shaped in construction and includes two leg members 60, 62 which embrace the trapped bubble 54 and cause it to be gradually collapsed as it approaches nip rollers 56. A pair of rotatable adjusting rods 64, 66 threadably engage leg members 60, 62, respectively, for permitting adjustment of the angle therebetween to the desired configuration.

Trapped air bubble 54 causes the gusseted tube to be expanded or blown outwardly thereby causing the intucked gusseted walls 34, 36 to be forced outwardly. Consequently, bubble 54 causes gusset crease 42 to be forced from a position located inwardly of front and rear creases 38, 40 (FIG. 2a) to a position reversed and located laterally outwardly with respect to creases 38, 40 (FIG. 5a). Nip rollers 56 flatten the tube in the form shown in FIGS. 5 and 5a, and therefore the resulting flattened tube exiting from nip rollers 56 is of the form shown in FIGS. 5 and 5a.

The flattened tube is then printed to provide the printing desired on the outer surface of the bag, and is separated into bag blanks of predetermined lengths. One end of each bag blank is closed, preferably by heat seal 68 (FIG. 6) and the completed bag is formed.

The completed bag includes flush cut upper margins, with the front and rear walls 26, 28 facing one another. Creases 38, 40 form outwardly projecting V-shapes in cross-section and thereby provide means for an operator to reach between the front and rear walls and separate them for opening and filling the bags. Even when the bags are stored on pallets in piles, the creases 38, 40 retain their resiliency and when the bags are removed from the pile, the creases 38, 40 provide means for grasping and separating the front and rear walls from one another. The process of the present invention is readily adapted to continuous mass production, inasmuch as the tube moves continuously from the extruder, past the gusseting rods where the gussets are formed, and then on to the secondary apparatus 46 which forces the gussets outwardly and flattens the tube in the final configuration. Printing can easily be done on the resulting tube and the method produces a bag economically and efficiently. Thus, it can be seen that the device accomplishes at least all of its stated objectives.

What is claimed is:

1. A bag comprising,
an elongated seamless tube of sheet material, said tube comprising a front wall, a rear wall, and upper and lower ends, said tube being in flattened condition prior to filling with said front and rear walls in close facing relationship; said front and rear walls having upper and lower margins and lateral margins,
closure means securing said front and rear walls together adjacent said lower margins thereof to form a bottom closure;
at least one of said front and rear walls having a longitudinal crease formed therein and located intermediate the lateral margins thereof; said crease extending along the entire length of said one wall and having in cross section an apex pointing away from the other of said front and rear walls whereby said crease provides means for facilitating grasping and separating said front and rear walls from close facing engagement with one another; and a second longitudinal crease being provided in said other of said front and rear walls directly opposite said first mentioned crease, said first and second creases in cross section having apices pointing in opposite directions.

2. A bag according to claim 1 wherein said front and rear walls each have a pair of spaced apart longitudinal creases located intermediate the lateral margins thereof, said creases of said front wall having in cross section apices which point away from said rear wall and said creases in said rear wall having in cross section apices which point away from said front wall.

3. A bag according to claim 2 wherein said pair of creases of front wall are in registered alignment with said creases of said rear wall.

4. A bag according to claim 3 wherein said tube is comprised of plastic material.

5. A bag comprising:
an elongated tube of sheet material, said tube comprising a front wall, a rear wall, and upper and lower ends, said tube being in a flattened condition prior to filling with said front and rear walls in close facing relationship, said front and rear walls having upper and lower margins and straight lateral margins,
closure means securing said front and rear walls together adjacent said lower margins thereof to form a bottom closure;
said front and rear walls each having a pair of creases therein, said creases extending the length of said tube and being approximately straight and parallel to said lateral margins of said front and rear walls;
said creases of said front wall each having in cross section an apex extending outwardly away from said rear wall;
said creases of said rear wall each having in cross section an apex extending outwardly away from said front wall, said creases providing means for facilitating grasping and separating said front and rear walls from close facing engagement with one another.

6. A bag according to claim 5 wherein said creases of said front wall are in approximate registered alignment with said creases of said rear wall.

* * * * *